Patented Aug. 8, 1944

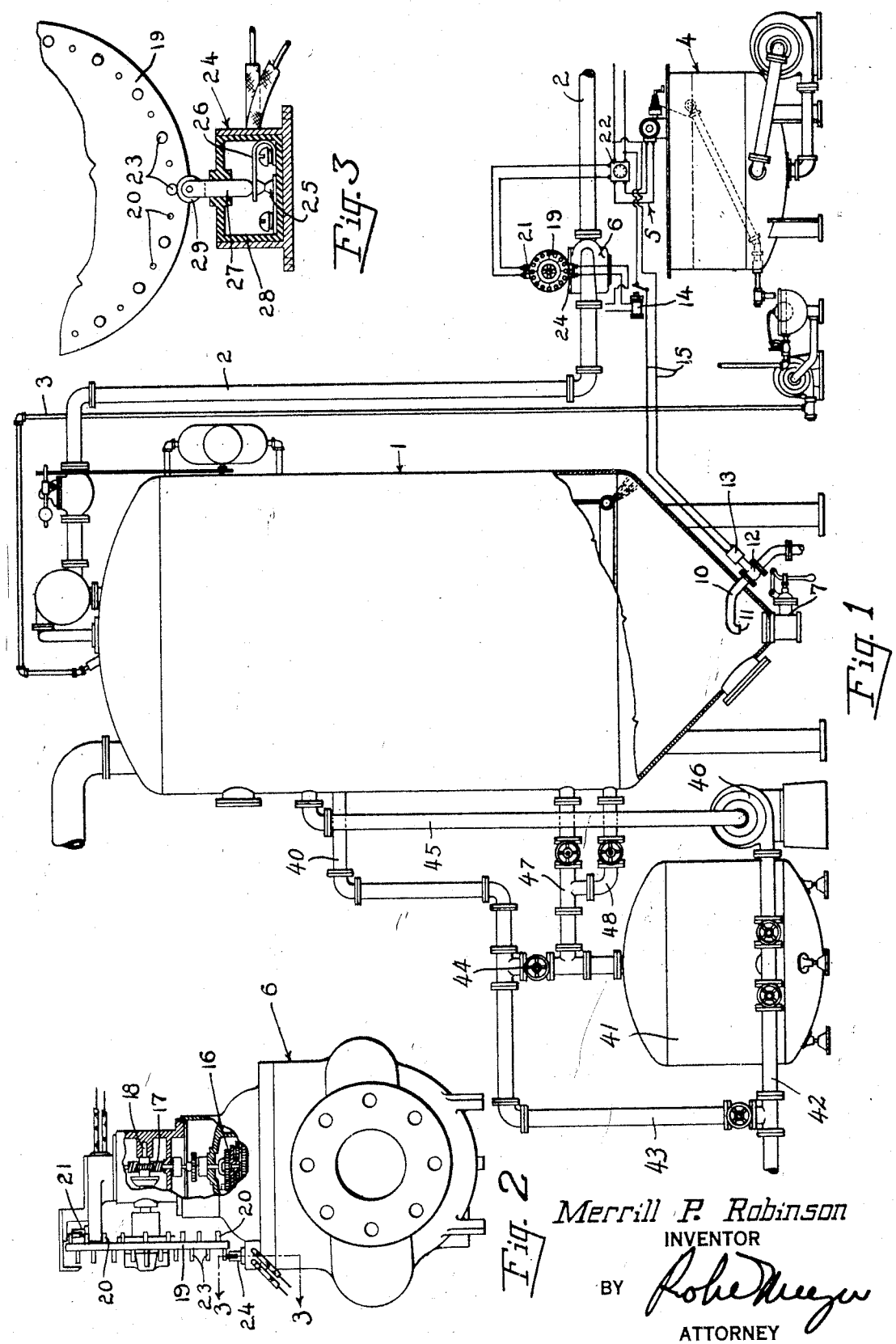

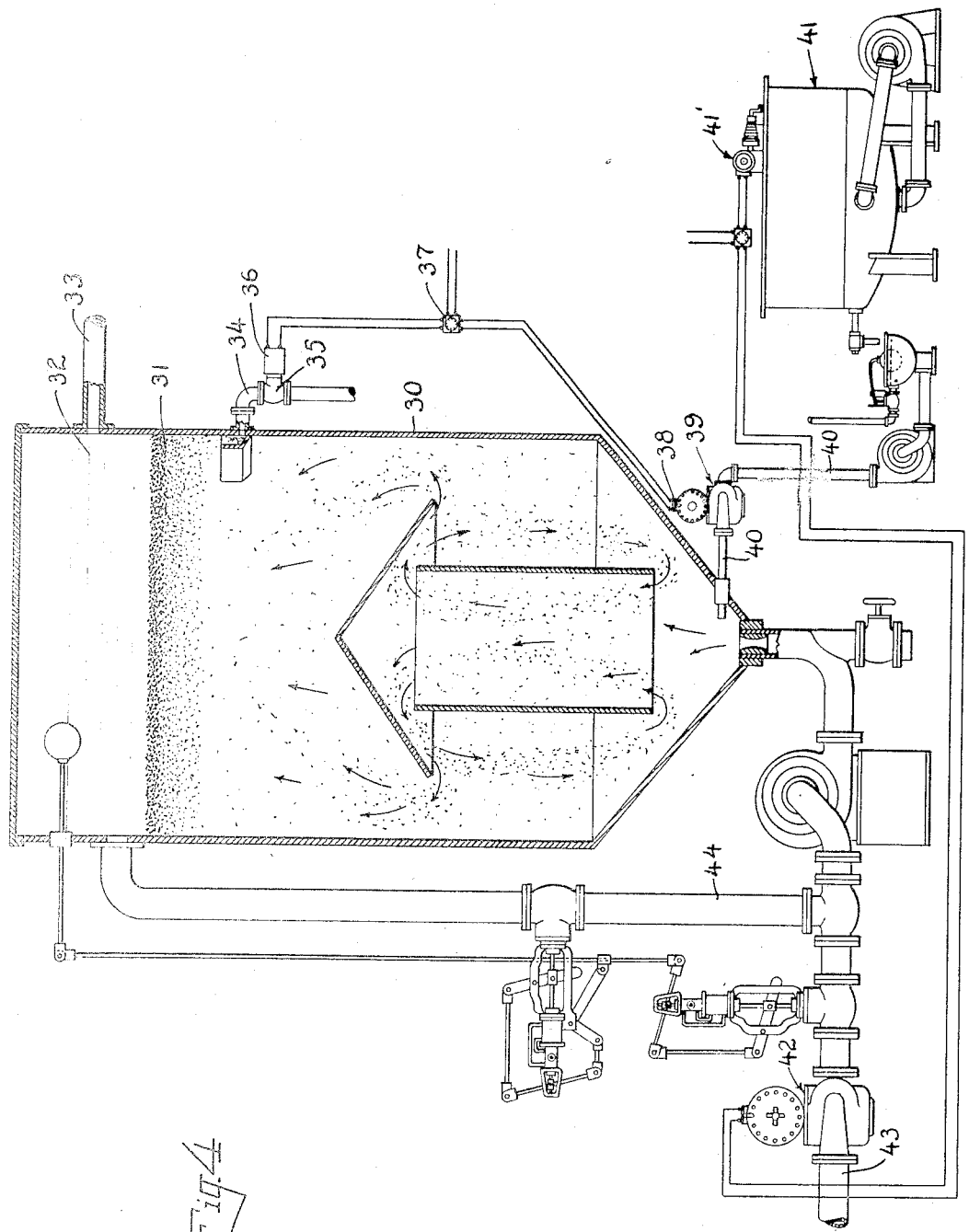

2,355,561

UNITED STATES PATENT OFFICE 2,355,561

WATER TREATING APPARATUS

Merrill P. Robinson, Upper Montclair, N. J., assignor to Worthington Pump and Machinery Corporation, Harrison, N. J., a corporation of Delaware Application July 13, 1942, Serial No. 450,732

4 Claims. (Cl. 210—16)

This invention relates to water treating and purifying apparatus and more particularly to the removal of sedimentation or sludge from the treating tank of such apparatus.

In water treating or purifying systems of the precipitating type, the sludge settles in the bottom of the precipitating or purifying tank. The quantity of such settling sludge depends upon the amount of impurities in the water being treated, and in water of approximately constant impurity content, is essentially in proportion to the quantity of water treated.

Heretofore it has been the general practice in precipitating water purification systems to remove or "blow off" the sludge with a relatively large area quick opening valve at long intervals of accumulation. This method of removing the sludge upsets the water level and the quiescence of the water under treatment, interfering with the essential operation of the apparatus and supply of treated purified water.

It is an object of the present invention to provide means for removing or drawing off the sludge from the treating or precipitating tank, either continuously or at frequent intervals, in accordance with the amount of raw or untreated water delivered to the precipitating tank.

More specifically, the present invention embodies means for drawing off or removing sludge from a precipitating tank of a water purification system, operation of which means is controlled by the quantity of untreated water flowing into the precipitating tank.

With these and other objects in view, as may appear from the accompanying specification, the invention consists of various features of construction and combination of parts, which will be first described in connection with the accompanying drawings, showing a water treating apparatus of the preferred form embodying the invention, and the features forming the invention will be specifically pointed out in the claims.

In the drawings:

Figure 1 is a view, partly in section, of a water treating or purifying system embodying the present invention.

Figure 2 is a detail view, partly in section, of a water meter employed in the system.

Figure 3 is a fragmentary section through the meter taken on the line 3—3 of Figure 2.

Figure 4 is a diagrammatic view, partly in section, of a modified form of the invention and showing a different type of water treating apparatus than that illustrated in Figure 1.

Referring more particularly to the drawings, what is commercially known as a hot process water treating apparatus or system is illustrated therein, and in such systems the water being purified or treated is also heated and deaerated so as to remove not only impurities in the nature of solid matter, but also to remove gaseous impurities such as oxygen.

The water treating and purifying apparatus illustrated in Figure 1 includes the treating or precipitating tank 1, into the top of which the raw untreated water is delivered by means of an inlet pipe 2. The raw water is treated in the receptacle 1 by a suitable chemical reagent, which is delivered to or injected into the receptacle 1 through the inlet pipe 3. The quantity of chemical reagent delivered to the precipitating tank 1 is controlled by the mixing tank and proportioning apparatus generically indicated by the numeral 4. This part of the apparatus, together with the specific construction of the proportioning apparatus indicated at 5, is specifically shown and described in my prior pending application, Serial No. 416,521 filed October 5, 1941.

A measuring water meter 6 is interposed in the raw water supply line 2 to the precipitating tank 1. This water meter may embody any of the approved constructions of water meter for measuring the quantity flow of water. Such meters may be purchased upon the open market. However, the meter embodies particular mechanism for controlling the proportioning apparatus 5. Such mechanism is specifically shown and described in my companion application above referred to.

The foreign material, or impurities, separated out from the raw water in the precipitating tank 1 settle to the bottom of the tank in a system of this type. It is desirable and necessary to remove such sludge, or sediment, so as to prevent excessive accumulation thereon. The method of such removal which is in common practice at the present time consists in opening a valve such as shown at 7. The valve 7 is of relatively large area and is a quick opening valve so that when it is opened the quick removal of the sludge upsets the quiescence of the water being treated in the receptacle 1, and interferes with the normal flow path of water through the receptacle, thus interfering with the proper treatment of the water and consequently with the supply of treated water. The present invention embodies means whereby the sludge may be removed in proportion to the quantity of raw water flowing to the precipitating tank or receptacle 1 without disturbing the normal water treating or purification action within the tank 1. This means includes a nozzle, or pipe, 10, which is inserted through the tank 1 near the bottom thereof, and has its inlet opening indicated at 11 opening downwardly into the tank. The pipe 10 extends out of the tank and has its discharge to a sewer (not shown) or any other suitable place for disposal of the sludge. The valve 12 is interposed in the pipe 10 for controlling the flow of sludge therethrough. The valve 12 is of any approved type of solenoid-operated valve which may be purchased upon the open market.

The solenoid 13 of the solenoid-operated valve structure 12 is connected in an electrical circuit to a time delay relay 14. The time delay relay 14 is also of any approved type which may be purchased upon the open market. The electrical circuit 15, which is connected to the solenoid 13 and the time delay relay 14, is in turn connected to the circuit closing mechanism of the water meter 6.

The water meter 6 includes the usual gear train 16, which is operated by the mechanism of the meter. The gear train 16 in the present invention is, however, connected by suitable gearing 17 to a shaft 18. A disc 19 is mounted upon the shaft 18 and it has a plurality of pins 20 carried thereby extending in one direction from the disc. The pins 20 operate the switch mechanism 21, which latter is connected in an electrical circuit through the time delay relay 22 with the proportioning apparatus 5. The specific construction of the switch 21 and the proportioning apparatus 5 are disclosed and claimed in my companion application, Serial No. 416,521 filed October 5, 1941, and since they form no part of the particular invention of the present application will not be specifically described herein.

A second set of pins 23 are carried by the disc 19, and in Figures 2 and 3 of the drawings these pins are shown to project in the opposite direction from the disc 19 to that in which the pins 20 project. The pins 23 operate a switch mechanism 24, which may be carried by the casing of the meter 6 at any suitable position. The switch mechanism 24 includes a stationary contact 25 and a moveable contact structure 26. The stationary contact 24 is connected to one end of one line of the electrical circuit 15, while the moveable contact 26 is connected to another end of the same line, so that when the contacts 25 and 26 are in engagement the electrical circuit will be closed through the time delay relay 14 and the solenoid 13 for operating the valve 12.

A slideable plunger 27 is carried by the casing 28 of the switch structure 24, and it has a roller 29 on its outer end which engages the pins 23 during the rotation of the disc 19 by the meter mechanism. When one of the pins 23 engages the roller 29 it will move the plunger 27 inwardly and move the moveable contact 26 to engage with the stationary contact 25, which will close the electrical circuit through the time delay relay 14, energizing the solenoid 13 to open the valve 12, holding said valve in open position until the expiration of the time period for which the time delay relay 14 is set. The opening of the valve 12 permits the removal of the precipitate from the bottom of the receptacle 1 periodically, at intervals proportionate to the flow of water through the treating apparatus inlet pipe 2.

Both the time interval between the opening movements of the valve 12 and the period of time during which said valve remains open are adjustable, and are adjusted in accordance with the volume of water flowing through the treating apparatus, and also with the chemical composition of said water.

From the foregoing it will be noted that the sludge is withdrawn from the bottom of the precipitating tank 1 in proportion to the quantity of raw or untreated water flowing into the tank 1. In other words, the sludge is withdrawn from the tank 1 in proportion to its accumulation in the bottom thereof. The pins 23 can be set at various distances about the disc 19 so as to regulate the operation of the valve 12 at proper time intervals, which may be predetermined by the relatively known quantity of impurities in the water being treated, or by placing enough of the pins 23 about the disc 19 the valve 12 may be continuously held open during the flow of water through the meter 6 to the precipitating tank 1.

Treated water is withdrawn from the precipitating tank 1 through the outlet pipe 40 and normally passes through this outlet pipe into the filter 41 from which it is taken to the point of use through the pipe 42. A branch pipe 43 is provided which, when the valve 44 is closed, permits the treated water to bypass the filter 41.

The pipe 45, pump 46, and pipes 47 and 48 are provided to permit reversal of the normal directional flow of treated water through the filter 41 for washing this filter.

While in the drawings a particular type of chemical reagent mixing, proportioning and delivering apparatus is shown, it is to be understood that the present invention may be employed in connection with any approved type of such mechanism without departing from the spirit of the present invention, and also while the particular features of the present invention are shown and described as employed in connection with a particular type of water treating apparatus, the features of the invention may be employed with any suitable approved type of apparatus without departing from the spirit of the present invention.

In Figure 4 of the drawings, the features of the present invention are shown as employed in connection with a water treating apparatus of the cold process type, wherein the foreign material precipitated from the water in the precipitating tank or receptacle 30 accumulates in a flock bed 31 and the treated water filters through the flock bed 31 into the storage space 32 for treated water. The treated, purified water is withdrawn from the storage space 32 through an outlet 33.

The particular construction of cold process treating apparatus shown in Figure 4 of the drawings is illustrated, described and claimed in my companion application, Serial No. 390,238, and while the features of the present invention are shown in this figure as applied to a cold process treating apparatus of this particular form and construction, it is to be understood that the features of the invention may be applied to any other suitable type of cold process treating apparatus without departing from the spirit of the present invention since the particular construction of cold process treating apparatus shown herein is merely for the purpose of showing the application of the invention.

In cold process treating apparatus, where the precipitate, or sludge, accumulates in a flock bed, which forms a filter through which the treated water passes, it is necessary at times to draw off portions of the precipitate so as to prevent excessive depth of the filtering flock bed, and for this purpose a sediment removal pipe 34 is connected to and opens into the precipitating receptacle 30 at a predetermined point below the flock bed 31. A solenoid-actuated valve 35 is connected in the pipe 34 and controls the flow of the sludge, or precipitate, through the pipe. This valve 35 may be of any approved type of solenoid valve which may be purchased upon the open market. The solenoid 36 of the solenoid-actuated valve 35 is connected in circuit with a time delay relay 37, which is also of any approved type that may be purchased upon the open market. The time delay relay 37 is in turn connected with the switch mechanism 38 of the meter structure 39. The meter structure 39 is identical with the meter structure shown in Figures 2 and 3 of the drawings, as is also the switch structure 38 identical with the switch structure 24.

In Figure 4 of the drawings, the meter 39 is shown connected in the pipe 40, which delivers the chemical reagent into the precipitating tank 30 from the chemical reagent mixing and proportioning apparatus 41. The chemical mixing and proportioning apparatus 41 is the same as the structure illustrated in Figure 1 of the drawings and described in my companion application, Serial No. 416,521 filed October 5, 1941. The meter 42, which controls operation of the proportioning apparatus 41' is positioned in the raw water supply line 43 in advance of the recirculating pipe 44 so that reagent chemicals will be delivered to the precipitating tank 30 only in proportion to the quantity of raw water fed into the tank and not in proportion to the treated water which is recirculated through the precipitating tank 30 by the recirculating system, including the recirculating pipe 44. The recirculating mechanism forms no part of the present invention, it being specifically described and claimed in my companion application, Serial No. 390,238 filed April 25, 1941.

With the meter 39 positioned in the chemical reagent supply pipe 40 it will be seen that the valve 35 is controlled by the quantity of chemical reagent flowing to the precipitating tank 30, and since the quantity of chemical reagent flowing to the tank 30 is controlled by means of the meter 42 and the proportioning apparatus 41' by the quantity of raw water delivered to the precipitating tank 30, the withdrawal of the precipitate, or sludge, will be indirectly controlled by the quantity of raw water delivered to the precipitating tank 30.

It will be understood that the invention is not to be limited to the specific construction or arrangement of parts shown, but that they may be widely modified within the invention defined by the claims.

What is claimed is:

1. In a water treating apparatus, the combination, of a precipitating tank having an inlet for untreated water and an outlet for treated water, means for delivering raw untreated water to said precipitating tank, a meter for measuring raw untreated water delivered to said precipitating tank, means for removing precipitated foreign material from said tank including a valve, a solenoid for operating said valve, and means operated by said meter and operatively connected to said solenoid for energizing and de-energizing said solenoid whereby said opening and closing of said valve will be wholly controlled by the flow of raw water through said meter.

2. In a water treating apparatus, the combination, of a precipitating tank having an inlet for untreated water and an outlet for treated water, means for delivering raw untreated water to said precipitating tank, a meter for measuring raw untreated water delivered to said precipitating tank, means for removing precipitated foreign material from said tank including a valve, a solenoid for operating said valve, means operated by said meter and operatively connected to said solenoid for energizing and de-energizing said solenoid whereby said opening and closing of said valve will be wholly controlled by the flow of raw water through said meter, and means in the connection between the meter operated means and the solenoid for imposing a predetermined time delay between the operation of the meter operated means and energizing and deenergizing of the solenoid.

3. In a water treating apparatus, the combination, of a precipitating tank having an inlet for untreated water and an outlet for treated water, means for delivering raw untreated water to said precipitating tank, a meter for measuring raw untreated water delivered to said precipitating tank, means for removing precipitated foreign material from said tank including a valve, a solenoid for operating said valve, means operated by said meter and operatively connected to said solenoid for energizing and de-energizing said solenoid whereby said opening and closing of said valve will be wholly controlled by the flow of raw water through said meter, and said meter operated means being adjustable for varying the relation between the operation of the meter and the energizing and de-energizing of the solenoid.

4. In a water treating apparatus, the combination, of a precipitating tank having an inlet for untreated water and an outlet for treated water, means for delivering raw untreated water to said precipitating tank, a meter for measuring raw untreated water delivered to said precipitating tank, means for removing precipitated foreign material from said tank including a valve, a solenoid for operating said valve, means operated by said meter and operatively connected to said solenoid for energizing and de-energizing said solenoid whereby said opening and closing of said valve will be wholly controlled by the flow of raw water through said meter, means in the connection between the meter operated means and the solenoid for imposing a predetermined time delay between the operation of the meter operated means and energizing and deenergizing of the solenoid, and said meter operated means being adjustable for varying the relation between the operation of the meter and the energizing and de-energizing of the solenoid.

MERRILL P. ROBINSON.